United States Patent
Schrodi et al.

(10) Patent No.: US 6,590,896 B1
(45) Date of Patent: Jul. 8, 2003

(54) ATM COMMUNICATIONS SYSTEM FOR TRANSMITTING INTERNET DATA PACKETS

(75) Inventors: Karl Schrodi, Geretsried (DE); Wolfgang Fischer, Germering (DE); Ernst-Heinrich Göldner, München (DE)

(73) Assignee: Siemens Aktiengesellschft, Munich (DE)

( * ) Notice: Subject to any disclaimer, the term of this patent is extended or adjusted under 35 U.S.C. 154(b) by 0 days.

(21) Appl. No.: 09/367,886

(22) PCT Filed: Feb. 9, 1998

(86) PCT No.: PCT/DE98/00363

§ 371 (c)(1),
(2), (4) Date: Aug. 20, 1999

(87) PCT Pub. No.: WO98/37725

PCT Pub. Date: Aug. 27, 1998

(30) Foreign Application Priority Data

Feb. 21, 1997 (DE) .......................... 197 04 061

(51) Int. Cl.[7] ............................................. H04L 12/28
(52) U.S. Cl. .................................. 370/395.52; 370/395
(58) Field of Search .............................. 370/395, 395.1, 370/395.6, 397, 399, 395.3, 395.31, 395.32, 395.5, 395.51, 395.52, 395.53, 395.61, 395.63, 409, 351–358

(56) References Cited

U.S. PATENT DOCUMENTS

| | | | | |
|---|---|---|---|---|
| 5,612,959 A | * | 3/1997 | Takase et al. ............... | 370/390 |
| 5,623,605 A | * | 4/1997 | Keshav et al. .......... | 395/200.17 |
| 5,732,071 A | * | 3/1998 | Saito et al. ................ | 370/255 |
| 5,764,645 A | * | 6/1998 | Bernet et al. ............... | 370/466 |
| 5,818,842 A | * | 10/1998 | Burwell et al. ............. | 370/397 |
| 5,822,320 A | * | 10/1998 | Horikawa et al. .......... | 370/395 |
| 5,903,559 A | * | 5/1999 | Acharya et al. ............ | 370/355 |
| 6,014,381 A | * | 1/2000 | Troxel et al. ............... | 370/395 |

FOREIGN PATENT DOCUMENTS

EP        0 597 487 A2      5/1994

OTHER PUBLICATIONS

Peter Newman et al, "Flow Labelled IP: A Connectionless Approach to ATM", IEEE (1996), vol. 3, No. 15, pp. 1251–1260.

Debanjan Saha et al, "A Design for Implementation of the Internet Protocol in a Local ATM Network", IEEE (1994), pp. 1326–1330.

Guru Parulkar et al, "AITPM: A Strategy for Integrating IP with ATM", Computer Communication Review, vol. 25, No. 4, (1995), pp.49–58.

Th. Zahariadis et al, "Internet Access Over Residential ATM Networks", SPIE, vol. 2953, (1996), pp 98–106.

Wolfgang Fischer et al, "Netzsymbiose zum gemeinsamen Erfolg", Telcom Report 19, (1996), pp. 35–38.

* cited by examiner

*Primary Examiner*—Wellington Chin
*Assistant Examiner*—Brenda Pham
(74) *Attorney, Agent, or Firm*—Fish & Richardson P.C.

(57) ABSTRACT

Components for transmitting ATM cells related to Internet data packets are additionally integrated in an ATM communications system for transmitting data and data packets packed in ATM cells for ATM communications networks which are formed by ATM communications systems. The complete integration of the Internet transmission function into ATM communications systems results in effective traffic and network management of ATM cells related to Internet data packets with a very low level of integration complexity.

22 Claims, 3 Drawing Sheets

ATM COMMUNICATIONS SYSTEM FOR TRANSMITTING INTERNET DATA PACKETS

With the increasing importance of the Internet or "World Wide Web", the Internet protocol is increasingly influencing the design of existing and future communications networks. The currently used and standardized Internet protocol—in particular Internet Protocol Version 4—is packet-oriented, that is to say the information to be transmitted is packed into data packets. These Internet data packets are in each case preceded by an Internet data packet header, in which a source and destination address, comprising 32 bytes, is stated. 128 bytes are provided for both the source address and the destination address in a future planned version. With the aid of a current or a future Internet protocol, a communication link is produced between Internet communications terminals, that is to say in particular computers, with the communications terminals being connected directly via "point-to-point" data links.

Owing to the considerable rate of growth of the Internet, additional infrastructures need to be provided for this purpose, and the communications networks need to be adapted or added to. One possible adaptation is represented by Internet switching devices—called routers or gateways in the specialist world and referred to as routers in the following text—which are used in the edge region of communications networks as access routers or gateways (edge routers) and, in the communications network itself, as special Internet routers. Communications network concepts for the transmission of Internet data packets in which the routers are produced using ATM technology (Asynchronous Transfer Mode) have been under discussion for a long time. In this case, in the access routers or else in the access network associated with the access router, the Internet data packets are packed in ATM cells and transmitted, via the ATM communication network, to special Internet ATM routers. These Internet ATM routers are connected to specific ATM communications systems in the ATM communications network like a server, and provide a virtual Internet overlay network which is superimposed on the ATM communications network, with the Internet ATM routers essentially being connected via permanent virtual connections (PVC) and semi-permanent virtual connections (SPVC).

This concept with additional "edge" routers and special ATM routers in ATM communications networks means that, with increasing acceptance and widening use of the Internet, there will be, owing to the additional routing functions in the ATM communications systems to and from the Internet ATM routers, a considerable additional traffic load on the ATM communications systems in the ATM communications networks, leading to a reduction in the transmission service for the data and data packets for other services.

EP 0 597 487 A2 discloses a communications system in which data packed into ATM cells and data packets packed into ATM cells are transmitted via an ATM switch. For transmission of ATM cells related to Internet data packets from the ATM cell stream, the destination address information for the Internet data packets is transmitted to the ATM communications system from a connected ATM communications terminal with the aid of a special ATM cell. Routing information is derived from the destination address information in the ATM communications system. The derived routing information is then inserted into each ATM cell in an Internet data packet, for transmission via an ATM communications network.

The document IEE, 1996, Flow Labelled IP: A Connectionless Approach to ATM, Peter Newman et al. discloses an ATM communications network in which a local area network LAN is emulated for the connection of internet communications terminals. A "Connectionless ATM" is provided for the transmission of the Internet data packets. Within the ATM communications network, signalling in accordance with the ATM Adaption Layer (AAL-5) is provided in the ATM communications systems.

The object on which the invention is based is to improve the integration of Internet in ATM communications networks. The object is achieved by the features of claim 1.

The major aspect of the invention is that the ATM communications systems for transmitting data and data packets packed into ATM, cells are additionally provided, for transmitting Internet data packets, with means for selecting ATM cells related to Internet data packets from the ATM cell stream, means for finding Internet data packet headers from the selected ATM cells and means for extracting the destination address information contained in Internet data packet headers. Additional means are advantageously provided for sorting the transmitted ATM cells to form the respective Internet data packets and means for collecting the sorted ATM cells on the basis of specific Internet data packets and for passing on Internet data packet ways.

The complete integration of the Internet routing function in the ATM communications systems allows the ATM cell stream within the ATM communications network to be considerably reduced, since there is no need for the Internet data packets to be routed, possibly via a number of ATM communications systems, to the relevant Internet ATM routers. This means that it is possible to dispense entirely with the Internet ATM routers, and the integration of the Internet routing function in the ATM communications systems can be achieved with little additional circuitry and programming complexity. The already existing components of the ATM communications systems remain unchanged, that is to say they do not need to be modified.

The integration results in very short delays for the Internet data packets to be transmitted, since there is no routing to Internet ATM routers. A further advantage can be seen in integration, in particular retrospective integration, in that there is no effect on ATM traffic that is not related to Internet data packets. Furthermore, a universal ATM communications network can be provided for various types of traffic and service, which can be configured and matched to the respective requirements with very little effort, depending on user requirements, and the Internet routing function can be retrofitted or removed at any time.

For integration of the additional means for transmitting ATM cells related to Internet data packets, these are advantageously assigned to the individual system components as a function of the system architecture of the ATM communications system—claim 3. In this case, both the concept of the ATM communications system with ATM multiplexers, line termination units, ATM switching networks and alternatively from ATM statistics multiplexers, and the fundamental ATM switching principle within the ATM communications system need to be taken into account—for example the self-routing principle using communications-system internal headers and a connection identification. It is particularly advantageous for the additional means for transmitting ATM cells related to Internet data packets to be integrated between the communications connections and the ATM switching network—claim 4—, since, in this case, the integration takes place directly in the data path, that is to say in the existing transmission path for ATM cells. Transmission of additional information for determining the routing information within the ATM communications system is largely avoided with such integration.

Five advantageous implementation versions—claims 5 to 9—are possible for the integration of the additional means for transmitting ATM cells related to Internet data packets, which are based on an ATM communications system concept in which line units which provide ATM communications connections are connected to at least one ATM multiplexer for multiplexing ATM cells transmitted by the line units, and at least one ATM statistics multiplexer, which is connected on the input side to ATM multiplexers, is provided for buffer storage and for statistical distribution of the ATM cells, as well as an ATM switching network which is connected to the at least one ATM statistics multiplexer.

The most advantageous integration in an ATM communications system conceived in such a way is represented by the integration of the additional means for transmitting ATM cells related to Internet data packets in the stastistics multiplexer—claim 6. In this case, a single buffer store can advantageously be used for the buffer storage of ATM cell queues not only for ATM cells related to Internet data packets but also for ATM cells which are not related to Internet data packets, and the existing means for inserting ATM cells to be transmitted to the ATM switching network or to the ATM multiplexer are also used. Furthermore, [lacuna] are included by the integration of the additional means for transmitting ATM cells related to Internet data packets into the Traffic Management and Quality of Service Procedures, which have been standardized at the ATM forum and are implemented in the ATM statistics multiplexer. In this case, the Internet links can be included on the basis of their service class in the overall concept of the ATM communications system for handling ATM links in different classes—for example "real time" or "non-real time" links with an UBR (unspecified bitrate), ABR (available bitrate) etc., as a result of which the integration complexity is considerably reduced.

One advantageous development of the communications system according to the invention can be seen in that, for transmitting ATM cells related to the Internet with predetermined, virtual path information and/or virtual channel information, means are provided for selecting ATM cells related to Internet data packets as a function of the predetermined virtual path information and/or virtual channel information—claim 13. The assignment or specification of specific virtual paths for Internet data packets allows an advantageous implementation for the indentification of ATM cells related to Internet data packets. When transmitting using the self-routing principle and when transmitting ATM cells related to Internet data packets using predetermined routing information (which is derived from the virtual path information and/or virtual channel information and is internal to the communications system) and a connection identification, means are provided for selecting ATM cells related to Internet data packets as a function of the predetermined routing information (which is internal to the communications system), and a connection identification—claim 14.

According to a further advantageous refinement of the ATM communications system according to the invention, the means for extracting the destination address information contained in Internet data packet headers comprise means for finding the destination address information inserted in the Internet data packet headers and means for passing on the destination address information to the means for deriving routing information from the destination address information—claim 15. These means are normally implemented as programs in the ATM statistics multiplexer.

According to a development of the ATM communications system according to the invention in that the following items are provided for ATM cells related to Internet data packets with Internet multicast destination address information in the Internet data packet header: means for assigning further routing information to Internet multicast destination address information in the routing table, and means for copying the respective ATM cells and for introducing in each case one further routing information item—claim 19. Storage of a number of communications network routing information items relating to Internet destination address information makes it possible to copy and transmit ATM cells related to Internet data packets to a number of ATM communications systems in the ATM communications network, in which case further "multicast" routing information is determined and inserted in the ATM communications systems which have received these ATM cells, possibly after further assessment of the Internet destination address information.

Further advantageous refinements of the invention can be found in the further claims.

The invention will be explained in more detail in the following text with reference to three block diagrams, in which.

Figure 1:
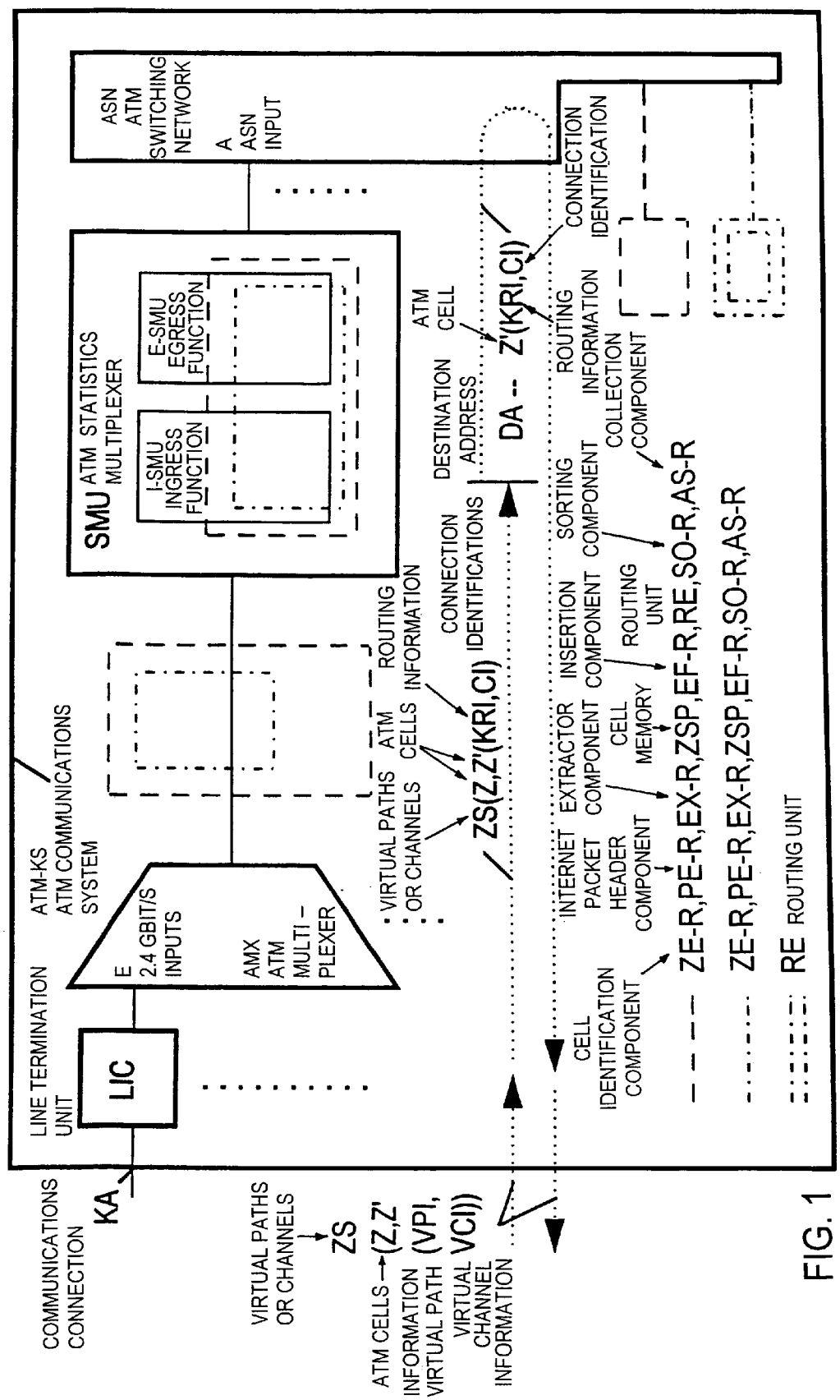
FIG. 1 shows a block diagram of the structure of an ATM communications system.

FIG. 1 shows an ATM communications system ATM-KS which, as a central switching component, has an ATM switching network ASN. The ATM switching network ASN represents a multistage ATM switching matrix which, in the various levels, comprises switching elements with queue controllers for the transmission of real time and non-real time ATM cells. For this purpose, the switching elements contain buffer stores or buffers, which are used to control the output queues. The ATM switching network ASN has, for example, eight 2.4 Gbit/s inputs E, to each of which an ATM statistics multiplexer SMU can be connected.

The ATM statistics multiplexer SMU has ingress and egress multiplex functions and units I-SMU,E-SMU, with the ingress function being provided for handling the ATM cells to the ATM switching network ASN and the egress function being provided for handling the ATM cells from the ATM switching network ASN. The ATM statistics multiplexer, SMU provides ATM cell traffic management in particular for the Quality, of Service functions. In the case, for example, of the "Quality of Service" which has been standardized at the ATM forum, a distinction is drawn, for example, between the real time and non-real time traffic classes or links with an UBR (unspecified bitrate), ABR (available bitrate) etc., for which the relevant ATM cells are in each case statistically multiplexed in different queues. A large buffer store or buffer is provided for the ATM cell traffic management, and is controlled with the aid of complex buffer management and ATM cell scheduling.

The ATM statistics multiplexers SMU are connected via appropriate inputs to an ATM multiplexer AMX, whose inputs E are each connected to a line termination unit LIC. The line termination units LIC each have an output with a transmission speed of, for example, 155 Mbit/s and provide a communications connection KA to which ATM cells which are related to Internet data packets and ATM cells which are not related to Internet data packets are passed, for example, from Internet communications devices. The line termination units LIC are designed, for example, for the connection of ATM communications systems or ATM communications terminals—not illustrated—in which case it is also possible to connect ATM communications terminals using Internet protocols or Internet functions. The Internet data packets IDP as well as non-Internet data packets DP from the other ATM communications devices are inserted into ATM cells Z'Z, with the transmission addresses of the Internet data packets IDP being represented by an Internet source and destination address DA by means of a [lacuna] in the cell header of the respective Internet data packet. The ATK cells Z' related to Internet data packets are defined as such by predetermined virtual path information PVI (which is predetermined when the connection is being set up and is predetermined during the connection) and/or virtual channel information VCI, that is to say the virtual paths or channels for the Internet are defined—indicated by ZS(Z,Z' (VPI, VCI) in FIG. 1.

In the line termination unit LIC, routing information KRI which is internal to the communications system and connection identifications CI are derived on a connection-specific basis from the virtual path and channel information VPI, VCI of the ATM cells Z' related to Internet data packets, for self-routing of said ATM cells Z,Z' in the ATM switching network ASN, are preceded in an additional cell header ZK for the respective ATM cell Z,Z' and are passed on via the ATM multiplexer AMX to the ATM statistics multiplexer SMU—indicated in FIG. 1 by ZS(Z,Z' (KRI, CI).

FIG. 1 also shows five versions relating to the integration of the means for transmitting ATM cells (Z') related to Internet data packets in the ATM communications system ATM-KS. This shows all the envisaged means RE-R,PE-R, EX-R,ZSP,RE,EF-R,SO-R,AS-R for the transmission of Internet data packets PD by rectangles with dashed lines, with the means RE-R,PE-R,EX-R,ZSP,RE,EF-R,SO-R, AS-R being implemented between ATM multiplexer AMX and ATM statistics multiplexer SMU or in the ATM statistics multiplexer SMU, or being assigned to the ATM switching network ASN. The dashed-dotted rights comprise all the means RE-R,PE-R,EX-R,ZSP,EF-R,SO-R,AS-R for transmitting ATM cells Z' related to Internet data packets apart from the means RE for deriving routing information RI (which has been received by the means for extracting destination address information DA) from the destination address information DA and for passing it on to the means ZK-U for inserting the routing information RI into each ATM cell Z'. In other ATM communications system structures, for example without ATM statistics multiplexers SMU, the means RE-R,PE-R,EX-R,ZSP,EF-,SO-R,AS-R for transmitting ATM cells Z' related to Internet data packets may also be arranged or implemented in the remaining components, that is to say in the ATM multiplexer AMX or in the line termination units LIC.

Figure 2:
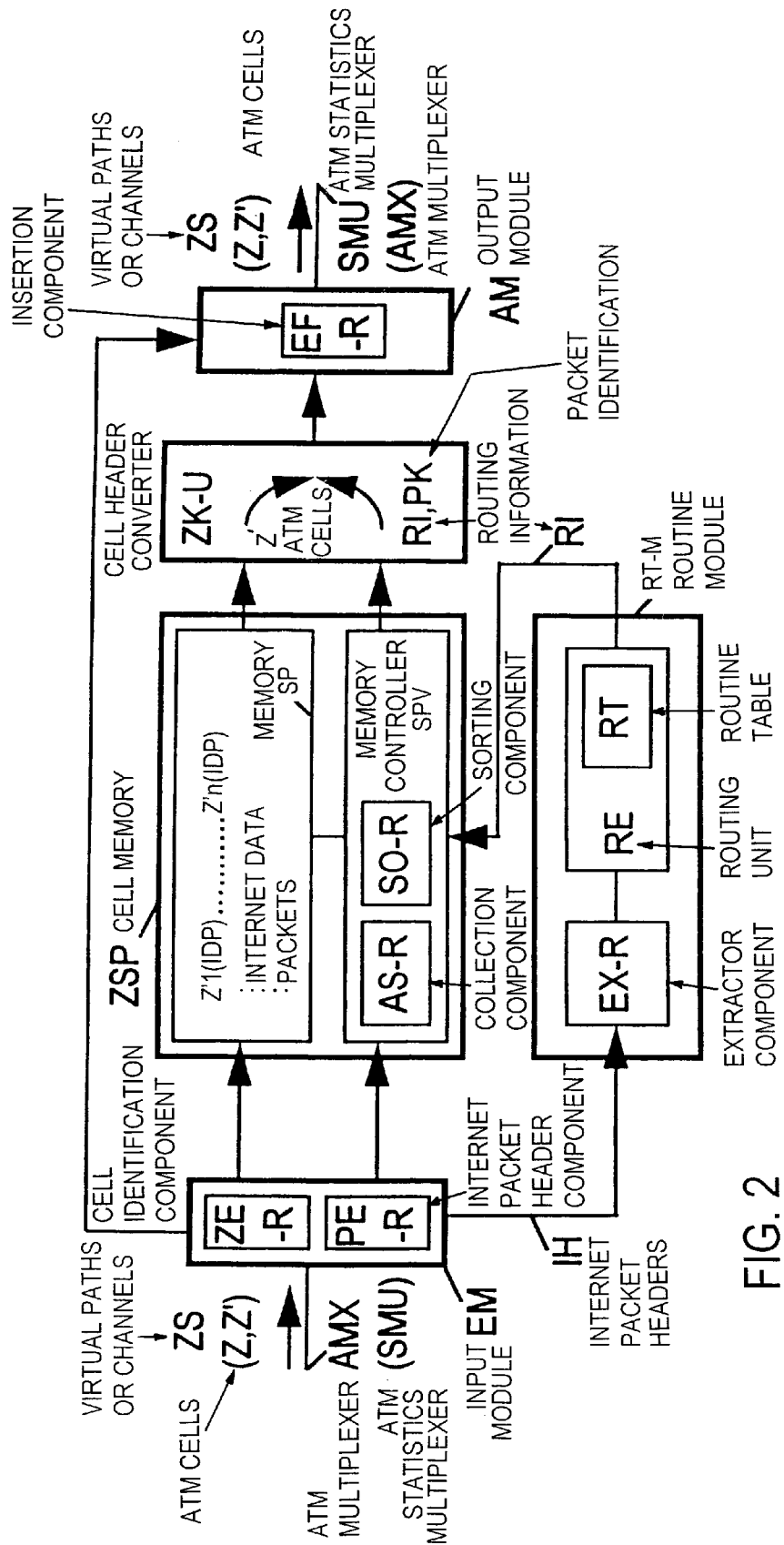
FIG. 2 shows a block diagram of the integration of the Internet routing function between and ATM multiplexer and an ATM statistics multiplexer in the communications system shown in FIG. 1.
Figure 3:
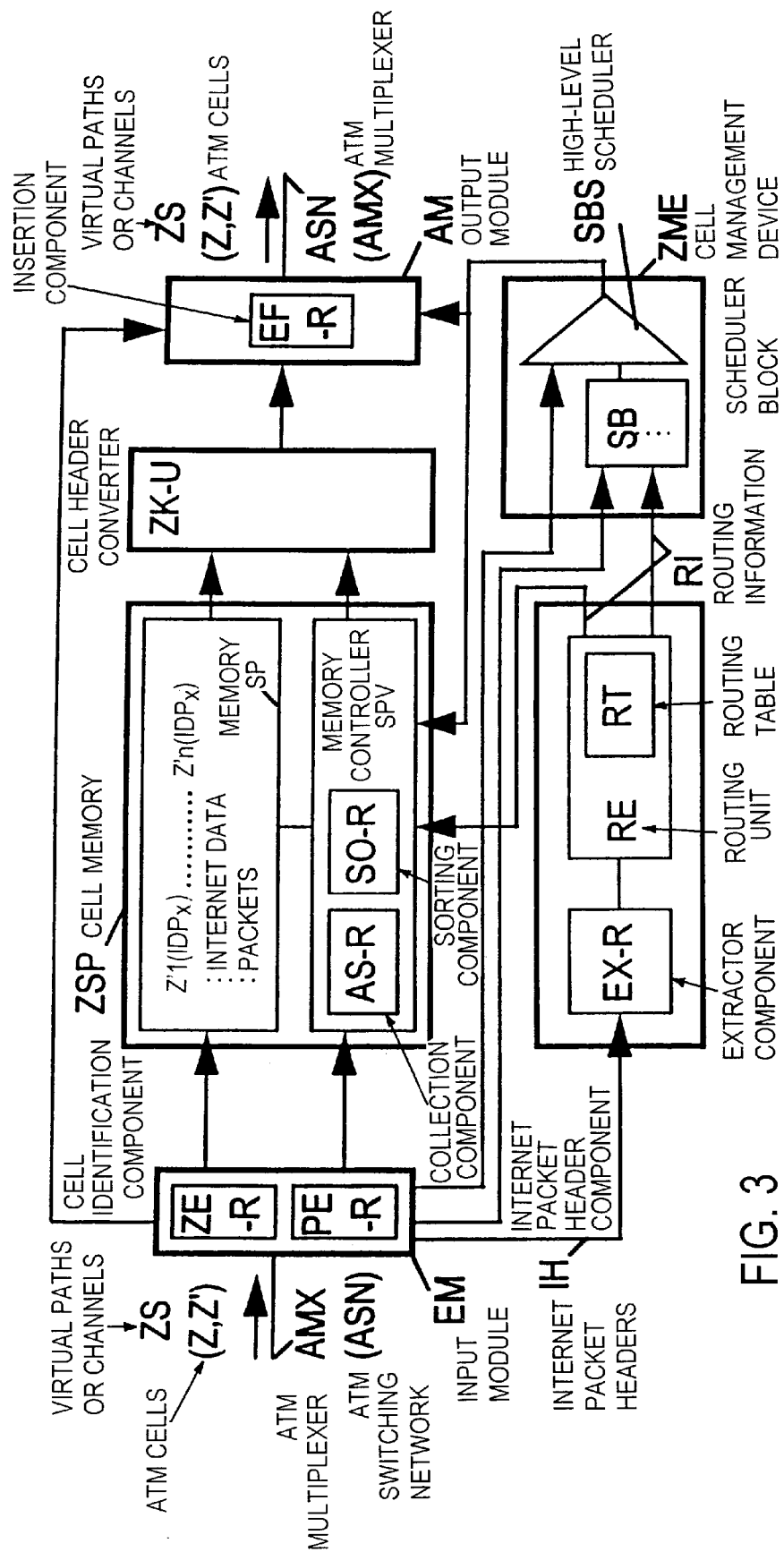
FIG. 3 shows a block diagram of the integration of the Internet routing function in the ATM statistics multiplexer in the communications system shown in FIG. 1.

FIG. 2 and FIG. 3 show the two most advantageous implementation versions, in which all the envisaged means RE-R,PE-R,EX-R,ZSP,RE,EF-R,AS-R,SO-R for transmitting Internet data packets IPD are arranged between the ATM multiplexer AMX and the ATM statistics multiplexer SMU—FIG. 2—or in the ATM statistics multiplexer SMU—FIG. 3.

FIG. 2 and FIG. 3 will be explained together in the following text, since a number of components and means are implemented in the same way, that is to say have identical functions, with one ingress unit I-SMU being shown in each case, and the engress function also being explained with reference to FIG. 2 and FIG. 3. The figures each shown an input module EM, in which a cell identification routine ZE-R which identifies ATM cells Z' related to Internet data packets, and an Internet packet header identification routine PE-R, which identifies the Internet packet headers IH of the Internet data packets IDP, is implemented. The identification of ATM cells Z' related to Internet data packets is carried out in the exemplary embodiment using the predetermined routing information KRI which is internal to the communications system, and the connection identifications VI. Those ATM cells Z which are not related to Internet data packets are passed on, in FIG. 2, bypassing the arrangement according to the invention to an output module AM, in which, using an insert routine EF-R implemented in this module, ATM cells Z,Z' related to Internet data packets, related into the non-Internet data packets are joined together or multiplexed once again to form an ATM cell stream ZS(Z,Z'). In FIG. 3, only the real time ATM cells Z which are to be passed on immediately are passed on to the output module.

The ATM cells Z' related to Internet data packets are buffer stored in a cell memory ZSP while the Internet packet header IH is being processed, this cell memory ZSP being formed by a memory SP and a memory controller SPV. The Internet packet headers IH are passed on to a router module RT-M, in which an extractor routine EX-R and a routing unit RE is implemented. Using the extraction routine EX-R, the Internet destination addresses DA contained in the Internet packet headers IH are extracted, that is to say they are read from an address destination field which comprises, for example in accordance with the standardized Internet Protocol Version 4, the 32 bytes, or only the relevant field elements are read, and are passed on to the routing unit RE. In the routing unit RE, a routing table RT is used to determine routing information RI related to the ATM communications network, and this is transmitted to the memory controller SBV. In the routing table RT, each Internet destination address DA is assigned routing information RI related to the ATM communications network, in which case the routing information RI defines that further ATM communications system ATM-KS to which the respective Internet data packet IDP is to be transmitted. A precondition for this is the mapping of the Internet onto the ATM communications network, that is to say the Internet switching points are mapped onto the ATM communications network. The routing information RI is in this case formed taking account of the ATM transmission principle used, for example the self-routing principle, that is to say as routing information KRI which is internal to the communications system, and as connection identification CI. The routing information RI is transmitted via the memory controller SPV to a cell header converter ZK-U, and this is used to insert the routing information RI into every ATM cell Z', which is transmitted from the memory SP at the right time, in the relevant Internet data packet IPD.

Furthermore, a unique packet identification PK is allocated for each Internet data packet IPD with the aid of the memory controller SPV and, using the cell header converter ZK-U, is inserted into every ATM cell Z' in the respective Internet data packet IDP. In the exemplary embodiment, the packet identification PK is inserted into the additional cell header ZK of an ATM cell Z'. In this case, the start of an Internet data packet IDP is determined by identifying a data packet end identification (not illustrated) which is inserted into the ATM cell header ZK—particularly in the case of ATM cells in accordance with the standardized ATM Adaption Layer AAL 5—, and the data contained in the following ATM cell Z' are defined as the Internet data packet start and as the first ATM cell Z' of a following Internet data packet IDP, which is provided with a new, unique packet identification PK. If the ATM cell headers are structured differently, different methods must be provided for determining the different Internet data packets IDP, for example search for Internet data packet headers or parts of them.

In the ATM communications system ATM-KS according to the invention, the routing information VIP, VCI and the converted routing information KRI which is internal to the communications system as well as the connection identification CI are terminated, and the Internet destination address DA of the respective Internet data packet IDP is used to form the routing information RI (which implements an Internet routing function) for the ATM communications network, with the Internet being mapped by the routing information RI onto the ATM communications network—indicated in FIG. 1 by Z' (RI(KRI,CRI).

The additionally engress functions are implemented by a sorting routine SO-R and by a collection routine AS-R and by the memory controller SPV. In this case, the ATM cells Z' which are transmitted by the ATM switching network ASN via the input module EM, are stored in the memory SP and relate to Internet data packets are sorted into Internet data packets IDP with the aid of the packet identifications PK which are also transmitted, into Internet data packets IDP corresponding to the packet identification PK, and a complete inter-data packet IDP is in each case collected with the aid of the collection routine AS-R.

The cell header converter ZK-U is then used to convert the routing information KRI which is internal to the communications system and the connection identification CI into virtual path and channel information VPI, VCI which is specific to the communications network, and.the ATM cells Z' which have been provided with converted routing information RI are inserted in the form of Internet data packets and with the aid of the insertion routine EF-R into the ATM cell stream ZS which has the ATM cells Z which are already not related to Internet data packets. This ATM cell stream ZS passes via an ATM multiplexer AMX and via a line termination unit LIC to a further ATM communications system which is defined by the routing information RI.

In the integration shown in FIG. 3, all the ATM cells Z apart from the real time cells are supplied to a cell management device ZME in which, taking into account the standardized "Quality of Service" aspects, the ATM cells Z are statistically multiplexed into the respective "Quality of Service" specific queues. A two-staged scheduling concept is envisaged for the implementation of these, functions, in which case a portion of the queues is in each case logically formed and multiplexed in a plurality of scheduler block SB and a higher-level scheduler SBS, and are also called up for passing on, in which case the ATM cells Z,Z' are themselves buffer-stored in the memory SP, and the routing information RI is inserted in the cell header converter ZK-U.

We claim:

1. An ATM communications system for transmitting ATM cells of an ATM cell stream, said ATM cell stream comprising data packets packed into ATM cells or ATM communications networks formed by ATM communications systems, said ATM communications system comprising the following items for the transmission of ATM cells related to Internet data packets:
   a cell identification routine for selecting said ATM cells related to Internet data packets from said ATM cell stream,
   an Internet packet header routine for finding Internet data packet headers from said ATM cells related to Internet data packets,
   an extractor routine for extracting destination address information contained in said Internet data packet headers,
   a routing unit for deriving derived routing information from said destination address information, and
   an insertion component comprising a cell header converter, a cell memory, and an insertion routine wherein said insertion component inserts said derived routing information into each said ATM cell of an Internet data packet, for transmission via the ATM communications network,
   wherein base transmittal components are comprised of said cell identification routine, said Internet packet header routine, said extractor routine, said insertion component, and said routing unit.

2. The ATM communications system as claimed in claim 1, further comprising:
   a sorting routine for sorting transmitted said ATM cells to form respective said Internet data packet; and
   a collection routine for collecting said stored ATM cells on the basis of individual said Internet data packets and or passing them on as said Internet data packets, and
   wherein core transmittal components are comprised of said base transmittal components, said sorting route, and said collection route.

3. The ATM communications system as claimed in claim 2, wherein said core transmittal components used for transmitting said ATM cells are assigned to individual system components.

4. The ATM communications system as claimed in claim 2, wherein said core transmittal components for transmitting said ATM cells related to said Internet data packets are arranged between ATM communications connections of said ATM communications system and its ATM switching network.

5. The ATM communications system as claimed in claim 2, further comprising a multiplexer arrangement, said multiplexer arrangement comprising:
   line units which provide ATM communications connections, wherein said line units are connected to at least one ATM multiplexer for multiplexing said ATM cells transmitted by said line units,
   at least one ATM statistics multiplexer which is connected on an input side to said at least one ATM multiplexers for buffer storage and statistical distribution of said ATM cells, and
   an ATM switching network which is connected to said at least one ATM statistics multiplexer.

6. The ATM communications system as claimed in claim 5, wherein
   said core transmittal components related to said Internet data packets are integrated in said statistics multiplexers.

7. The ATM communications system as claimed in claim 5, wherein
   said core transmittal components related to said Internet data are assigned to said ATM switching network (ASN).

8. The ATM communications system as claimed in claim 1, further comprising:
   a memory controller for unique identification of said ATM cells in an Internet data packet which is to transmitted, and
   a sorting routing for sorting the transmitted said ATM cells to form said respective Internet data packets as a function of said unique identification.

9. The ATM communications system as claimed in claim 1, further comprising:
an Internet data packet transmission routine for transmitting said ATM cells in, in each case, one said Internet data packet to an output of said ATM switching network.

10. The ATM communications system as claimed in claim 1, further comprising:
a packet-oriented transmission routine for transmitted said ATM cells related to said Internet data packets which can be implemented for different Internet protocols using packet-oriented information transmission.

11. The ATM communications system as claimed in claim 1, where said extractor routine comprises:
an extractor finding routine for finding said destination address information inserted in said Internet data packet headers, and
an extractor forwarding routine for passing on said destination address information to said routine unit.

12. The ATM communications system as claimed in claim 1, wherein said extractor routine is designed for different Internet data packet headers.

13. The ATM communications system as claimed in claim 1, wherein said routing unit further comprises;
a routing table, and
search routine which searches said routing table.

14. The ATM communications system as claimed in claim 1, wherein said routing information is represented by routing information which maps the Internet onto said ATM communications network and is related to said ATM communications network, and
said routing information is represented together with a connection identification identified by identification information selected from the group consisting of: 1) virtual path information, and 2) virtual channel information, and routing information,
said routing information being internal to said ATM communications system, wherein said routing information is converted, together with a connection identification, into said identification information before being passed on to said ATM communications network.

15. The ATM communications system as claimed in claim 1, for said ATM cells related to Internet data packets which have Internet multicast destination address information in said Internet data packet header, further comprising:
an assignment routine for assigning further routing if information to said Internet multicast destination address information in a routing table, and
a copying routine for copying respective said ATM cells and for introducing in each case one further routing information item.

16. The ATM communications system as claimed in claim 1, further comprising:
an ATM cell buffer store for buffer storage of said ATM cells during the processing of switching procedures, and for passing on said selected ATM cells in a way which conforms with an ATM cell stream, wherein said cell buffer store is utilized when transmitting ATM cells related to Internet data packets.

17. The ATM communications system as claimed in claim 1, wherein
said base transmittal components are designed in accordance with the standardized ATM adaption layer AAL 5, wherein said ATM cells may include packet end information which indicates the end of a data packet, wherein said data packet may be an Internet data packet.

18. The ATM communications system as claimed in claim 5, wherein said core transmittal components related to said internet data packets are provided between said ATM multiplexers and said ATM statistics multiplexes.

19. The ATM communications system as claimed in claim 18, wherein assigned to said ATM switching network, said routing unit passing said derived routing information, derived from said destination address information extracted by said routine, on to said insertion component.

20. The ATM communications system as claimed in claim 19, wherein said core transmittal components related to said Internet data packets are integrated in said ATM statistics multiplexer.

21. The ATM communications system as claimed in claim 1, further comprising,
a path-channel cell selection routine for selecting said ATM cells related to said Internet data packets wherein said path-channel cell selection routine operates on Internet data packet information selected from the group consisting of predetermined virtual path information and virtual channel information, when
transmitting ATM cells related to the Internet with predetermined information cells selected from the group consisting of cells with predetermined virtual path information cells with predetermined virtual channel information.

22. The ATM communications system as claimed in claim 1, further comprising:
a routing cell selection routine for selecting ATM cells related to said Internet data packets, wherein said routing cell selection routine operates on predetermined routing information and a connection identification, wherein said predetermined routing information is internal to said ATM communications system, when
transmitting ATM cells related to Internet data packets using said predetermined routing information, wherein said predetermined routing information is internal to said ATM communications system, and is derived from:
1) Internet data packet information selected from the group consisting of predetermined virtual path information and virtual channel information, and
2) said connection identification.

* * * * *